United States Patent [19]

Mecca

[11] Patent Number: 4,742,680
[45] Date of Patent: May 10, 1988

[54] ANTIBALLISTIC MISSILE TARGETER

[76] Inventor: John Mecca, 110 Whittier Dr., San Remo, N.Y. 11754

[21] Appl. No.: 918,334

[22] Filed: Oct. 15, 1986

[51] Int. Cl.⁴ .............................................. F03G 7/06
[52] U.S. Cl. ...................................... 60/528; 60/527; 343/757
[58] Field of Search .................... 60/527, 528, 529; 126/424, 425; 343/757

[56] References Cited

U.S. PATENT DOCUMENTS 3,940,935  3/1976  Richardson et al. ................ 60/528
4,463,560  8/1984  Greenleaf et al. ................ 60/528 X
4,553,393  11/1985  Ruoff ................................. 60/528

Primary Examiner—Stephen F. Husar
Attorney, Agent, or Firm—Leonard Belkin

[57] ABSTRACT

A cylinder with one end convex, upon said end a disk with a hole in it sits upon it to act as a pivoting mounting plate; stretched nitinol wires are strung down the sides of the cylinder from the edge of the disk to the opposite end of the cylinder rim edge. Each wire is fed an independent voltage to cause length wise contraction of the wire. A computer harmonized actuation of the contractions and relaxations of the lengths of the nitinol wires causes the attitude of the disk mounting plate to change.

5 Claims, 2 Drawing Sheets

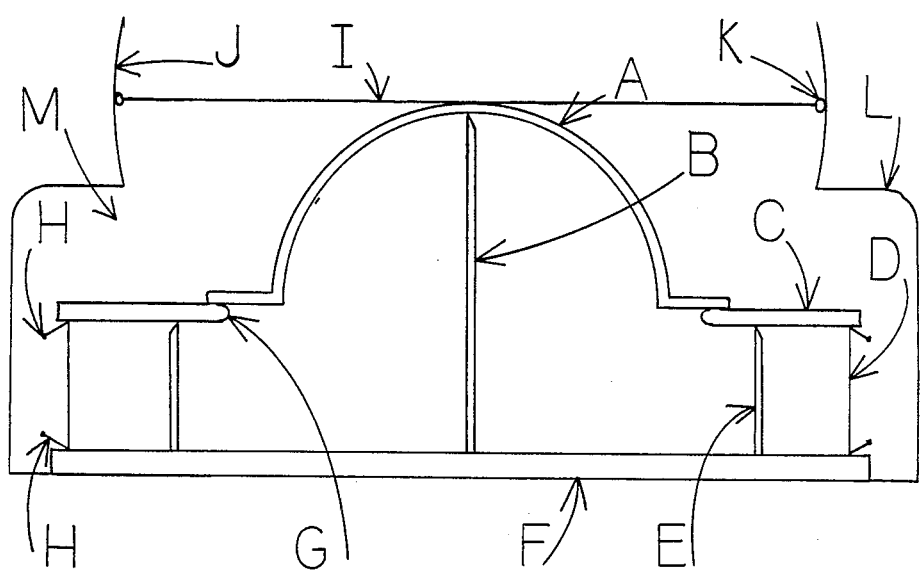

4,742,680

ANTIBALLISTIC MISSILE TARGETER

TECHNICAL FIELD

Relates to the alteration movements of mounting tables, for use in targeting missiles, aircraft, and targeting of robotic appendages.

BACKGROUND OF INVENTION

Numerous proposals for positioning targeting tables have been developed using electromagnetic fields to change table positions, and spring loaded teeth upon gear teeth to eliminate slack in mechanical drive trains.

A need to target distant moving objects, and those within immediate proximity such as artificial limbs are considered imperative to use such methods where the drive train has no moving parts, and hence no play between driving mechanism and driven mounting plate.

Accordingly there exists a need to combine rigid direct motion with rapidity in change of attitude of mounting plate repeatedly. The device of the present invention fulfills these three foregoing objectives.

SUMMARY OF THE INVENTION

The present invention takes advantages of the qualities of nitinol alloy wire stretched near the limit of its breakdown; and has the two ends of its length attached one end to the base of a cylinders rim edge, the other end of its length is attached to a disk with a hole in its center within which the convex end of the cylinder protrudes so as to allow the disk to pivot upon the convex lip end of the cylinder. Whereupon the plurality of wires stretched longitudinally around the cylinder, each wire termination being fastened with an insulator to prevent wire contact to the cylinder and disk so forming individual conductors, are then connected to individual rheostats ultimately controlled by computer coupled microwave radar. Each wire's rheostat input voltage correlates with target position integrated from computer coordination; thereby causing resistive contraction in length of particular wires in concert with all other wire inputs thus causing divergence of the disk mounting plate appropriately. The nitinol alloy which returns to original length when heated and associated mechanism of mounting plate ideally is within an enclosure partially evacuated with residual appropriate gas mixture combinations to cause efficient dissipation of heat from wire into gas molecules moving within the partial vacuum, or liquids to conduct heat away.

It is therefore an object of the present invention to eliminate freeplay slack from the drive train of movable targeting tables.

It is another object to cause divergence of a mounting table through resistive heating of suspension elements.

It is another object to directly correlate position into linear corresponding resistance.

The novel features which are believed to be characteristic of the invention, both to its organization and method of facilitating targeting together with further objectives and advantages thereof will be better understood from the following description considered in connection with the accompanying drawings in which a presently preferred embodiment of the invention is illustrated by way of example. It is to be expressly understood that the drawings are for the purpose of illustration and description only, and are not intended as a definition of the limits of the invention.

BRIEF DESCRIPTION OF THE INVENTION

FIG. 2 shows alternative embodiment with levers between the nitinol wire end and the movable table disk edge.

DETAILED DESCRIPTION OF THE PRESENTLY PREFERRED EMBODIMENT

Figure 1:
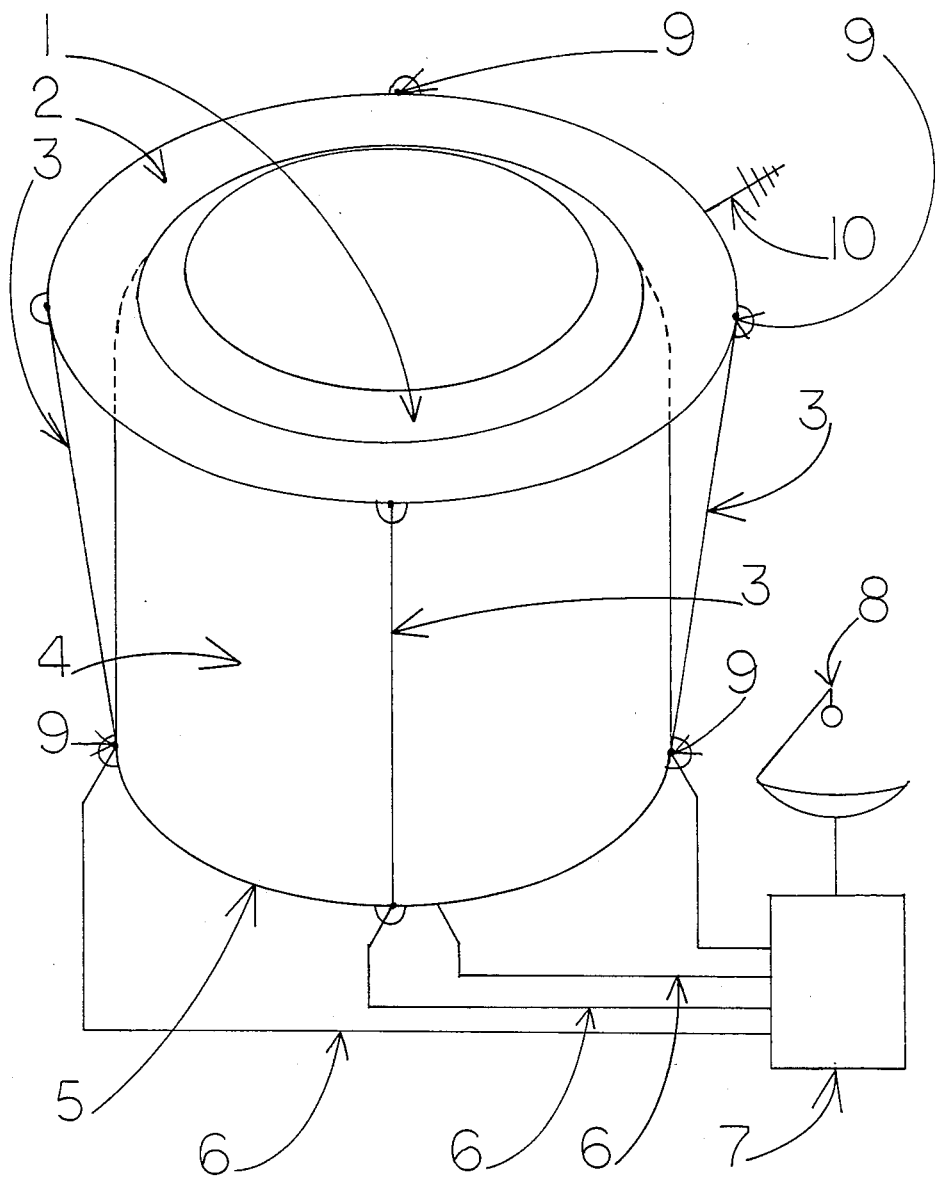
FIG. 1 is an illustration of a device embodying the present invention from a side perspective view showing the stationary cylinder and movable pivot disk with plurality of stretched nitinol wires arranged longitudinally between the disks outer edge and the end of the cylinder; and the terminations of all wires connected to the rheostat controller radar computer.

While this invention is susceptible of embodiment in many different forms, there are shown in the drawing and will be described in detail, preferred embodiment of the invention. It should be understood, however, that the present disclosure is considered as an exemplification of the principles of the invention and is not intended to limit the invention to the embodiments illustrated.

The precise shape and sizes of the components described are not essential to the invention unless otherwise indicated. The apparatus of this invention may utilize certain conventional cable tension control mechanisms, the details of which will be apparent to those having skill in the art and an understanding of the necessary functions of such mechanisms.

FIG. 1 shows stationary cylinder 4 with disk 2 sitting upon it, and convex end 1 protruding through it as its pivot; stretched nitinol wire 3's are connected to insulator point 9's at the edge of disk 2 and the end of cylinder lip 5. Individual rheostat connections from computer are 6's, and 10 represents the common ground lead for 's connections to computer voltage controller 7 and microwave sensing mechanisms 8.

FIG. 2 shows a side cutaway view where a base for mounting the device is letter F and a central pivot B holds up movable mounting plate A, flanking each side are fulcrums C with their pivots E; letter G details point of intersection where fulcrums leverage is communicated to movable table A, nitinol wires D actuate the movement of the fulcrum to multiply the force upon the movable table A, connection leads H ultimately lead to individual rheostats resistive heating for contraction and alternate relaxation of wire length, table I is stationarily attached to table A that they may move together as one; radius J serves as a seat upon which o-ring K travels upon, o-ring K is a direct extension of table I's perimeter in serving as a vacuum seal to containers L ability to retain the partial vacuum within it labeled M.

I claim:
1. A positioning apparatus comprising:
   a. a cylinder;
   b. a disk pivotably supported at one end of the cylinder;
   c. a plurality of nitinol wires attached about the circumferential edge of the disk and extending and attached to the cylinder at the end opposite of the disk;
   d. a source of electric current associated with each wire;
   e. whereby selective activation of electric current to each wire causes said wires to expand and contract in a predetermined manner to cause said disk to pivot in a predetermined manner to thereby orient said disk to a predetermined position.

2. The positioning apparatus of claim 1 in which the end of said cylinder on which said disk is supported is convex, said disk being pivoted on and about the convex end of said cylinder.

3. The positioning apparatus of claim 2 in which said disk has an opening, the convex end of said cylinder protruding through said opening.

4. Positioning apparatus comprising:
   a. stationary cylindrical means for pivotably supporting means to be positioned, said means to be positioned is a disk mounted on one end of said cylindrical means;
   b. means comprising a plurality of extended wires formed of temperature - responsive material distributed curcumferentially about said stationary means connected between one end of said stationary means and said means to be positioned; and
   c. means for selectively adjusting the temperature of each of said wires causing said wires to expand and contract in a predetermined manner to control orientation of said means to be positioned.

5. Positioning apparatus comprising:
   a. stationary means for pivotably supporting means to be positioned;
   b. means comprising a plurality of extended wires formed of temperature - responsive material distributed curcumferentially about said stationary means connected between one end of said stationary means and said means to be positioned;
   c. means for selectively adjusting the temperature of each of said wires causing said wires to expand and contract in a predetermined manner to control orientation of said means to be positioned; and
   d. means to change the force exercised by said wires on said means to be positioned comprising a plurality of levers for making contact at one end with each of said wires, the opposite end of each of said levers being in contact with said means to be positioned for changing the orientation of the latter.

* * * * *